(12) United States Patent
Brown

(10) Patent No.: US 10,996,488 B2
(45) Date of Patent: May 4, 2021

(54) EYEWEAR RETAINER APPARATUS

(71) Applicant: FUSE, LLC, Memphis, TN (US)

(72) Inventor: Matthew S. Brown, Falkner, MS (US)

(73) Assignee: FUSE, LLC, Memphis, TN (US)

( * ) Notice: Subject to any disclaimer, the term of this patent is extended or adjusted under 35 U.S.C. 154(b) by 31 days.

(21) Appl. No.: 16/141,349

(22) Filed: Sep. 25, 2018

(65) Prior Publication Data
US 2019/0094568 A1 Mar. 28, 2019

Related U.S. Application Data

(60) Provisional application No. 62/562,689, filed on Sep. 25, 2017.

(51) Int. Cl.
*G02C 3/02* (2006.01)
*G02C 3/00* (2006.01)
*G09F 13/04* (2006.01)
*G09F 21/02* (2006.01)
*G02C 11/04* (2006.01)

(52) U.S. Cl.
CPC .............. *G02C 3/003* (2013.01); *G09F 13/04* (2013.01); *G09F 21/02* (2013.01); *G02C 11/04* (2013.01)

(58) Field of Classification Search
CPC ......... G02C 3/003; G02C 3/006; G02C 11/04

USPC ............................................ 351/66, 155–157
See application file for complete search history.

(56) References Cited

U.S. PATENT DOCUMENTS

| 5,331,357 | A | * | 7/1994 | Cooley ................ G02B 6/0008 351/158 |
| 6,293,673 | B1 | | 9/2001 | Hirschman et al. |
| 6,764,177 | B1 | | 7/2004 | Chisolm |
| 7,467,867 | B1 | | 12/2008 | Williams |
| 7,845,795 | B2 | | 12/2010 | Williams |
| 8,366,268 | B2 | | 2/2013 | Williams |
| 8,523,350 | B2 | | 9/2013 | Krisik et al. |
| 9,128,304 | B2 | * | 9/2015 | Jones ..................... G02C 11/04 |
| 9,753,304 | B2 | | 9/2017 | Hadden et al. |
| 2007/0081324 | A1 | * | 4/2007 | Schrimmer ............ G02C 11/02 362/103 |
| 2016/0025997 | A1 | * | 1/2016 | Yribarren .............. G02C 3/003 351/156 |

* cited by examiner

*Primary Examiner* — Darryl J Collins
(74) *Attorney, Agent, or Firm* — Ashley Law Firm P.C.; Stephen S. Ashley, Jr.

(57) ABSTRACT

An eyewear retainer apparatus includes at least one elongate member adapted for being connected to the temples of a pair of eyeglasses and a light assembly connected to the elongate member. The light assembly can comprise a housing and a transparent or translucent cover member that can be removably attached to the housing. The transparent or translucent cover member can include a logo or other indicia engraved or printed on the surface of the cover member. The light assembly can illuminate the logo.

19 Claims, 9 Drawing Sheets

EYEWEAR RETAINER APPARATUS

CROSS REFERENCE TO RELATED APPLICATIONS

This application claims priority to U.S. Provisional Patent Application No. 62/562,689, filed Sep. 25, 2017 and incorporated herein by reference.

TECHNICAL FIELD

The present invention relates to eyewear accessories. An embodiment of the invention comprises an eyewear retainer apparatus having a light assembly, and a transparent or translucent section that can be illuminated by the light assembly. A logo, name or other indicia can be positioned on the transparent/translucent section.

BACKGROUND

There are known eyewear retainer devices adapted to help prevent eyewear, such as glasses, from falling off the head of the wearer and onto the ground or into a body of water. Such devices are particularly useful for those who wear glasses while engaged in rigorous physical activity and those wearing glasses while engaged in activities in or near bodies of water, such as swimming, surfing, water skiing, fishing, and boating. Such devices typically comprise an elongate cord or cable that attaches at opposite ends to the temples of the glasses. U.S. Pat. Nos. 7,845,795 and 8,366,268 disclose eyewear retention devices, and are incorporated herein by reference.

SUMMARY

One object of the present invention is to provide an eyewear retainer apparatus that can emit light. Another object of the invention is to provide an eyewear retainer apparatus that can display and illuminate a variety of logos or other indicia. These and other objects of the invention can be achieved in various embodiments of the invention described herein.

One embodiment of the invention comprises an eyewear retainer apparatus comprising at least one elongate member adapted for being connected to the temples of a pair of eyeglasses and a light assembly connected to the elongate member.

According to a preferred embodiment of the invention, the light assembly can comprise a housing and a transparent or translucent cover member that can be removably attached to the housing.

According to another embodiment of the invention, the light assembly can comprise a flexible printed circuit board and/or a light emitting diode.

According to another embodiment of the invention, the transparent or translucent cover member can include a logo or other indicia positioned on the surface thereof. The logo can comprise any alphanumeric characters and/or graphics, such as a company name, trademark, sports team and/or school name or insignia.

Another embodiment of the invention comprises a kit comprised of an eyewear retainer device and multiple transparent/translucent cover members, wherein each cover member has a different logo inscribed thereon.

Another embodiment of the invention comprises kit comprising a pair of eyeglasses, an eyewear retainer apparatus releasably attached to the eyeglasses, and multiple transparent/translucent cover members adapted for releasable attachment to the eyewear retainer apparatus, wherein each cover member has a different logo inscribed thereon.

Another embodiment of the invention comprises an eyewear retention apparatus comprising at least one elongate member having a first end and a second end, a first attachment member attached proximate the first end of the elongate member, and a second attachment member attached proximate the second end of the elongate member. The first and second attachment members are adapted to attach to the temples of a pair of eyeglasses. The apparatus includes a light assembly adapted to emit light that is attached to the elongate member intermediate the first attachment member and the second attachment member.

According to another embodiment of the invention, the light assembly comprises a housing containing a light emitting device therein, and at least a portion of the housing is transparent or translucent.

According to another embodiment of the invention, the light emitting device can be a flexible printed circuit board and/or a light emitting diode.

According to another embodiment of the invention, the light assembly comprises a housing containing a light emitting device therein, and a transparent or translucent cover member releasably attached to the housing, whereby at least some light emitted by the light emitting device can pass through the cover member.

According to another embodiment of the invention, the light emitting device comprises at least one selected from the group consisting of a flexible printed circuit board and a light emitting diode.

According to another embodiment of the invention, a logo is positioned on the cover member.

According to another embodiment of the invention, the logo is engraved or printed on the surface of the cover member.

According to another embodiment of the invention, the logo is comprised of alphanumeric characters and/or graphics.

According to another embodiment of the invention, the elongate member can be a cord or strap comprised of neoprene, nylon, cotton and/or leather.

According to another embodiment of the invention, the light assembly comprises a light emitting device and an ambient light sensor operatively connected to the light emitting device, whereby the light emitting device is activated to emit light when the ambient light sensor detects a level of ambient light below a predetermined minimum.

According to another embodiment of the invention, the elongate member can be a stainless steel cable.

According to another embodiment of the invention, the elongate member comprises a photoluminescent material, whereby the elongate member glows in the dark.

According to another embodiment of the invention, the elongate member comprises an illuminated fiber optic wire.

Another embodiment of the invention comprises an eyewear retention apparatus comprising a first elongate member having a first end and a second end, and a second elongate member having a first end and a second end, a first attachment member attached proximate the first end of the first elongate member, and a second attachment member attached proximate the first end of the second elongate member. The first and second attachment members are adapted for releasable attachment to the temples of a pair of eyeglasses. A light assembly can be attached proximate the second end of the first elongate member and proximate the second end of the second elongate member.

According to another embodiment of the invention, each of the elongate members comprise a transparent or translucent fiber optic wire, and the light assembly illuminates the fiber optic wire.

DETAILED DESCRIPTION OF PREFERRED EMBODIMENTS

Figure 1:
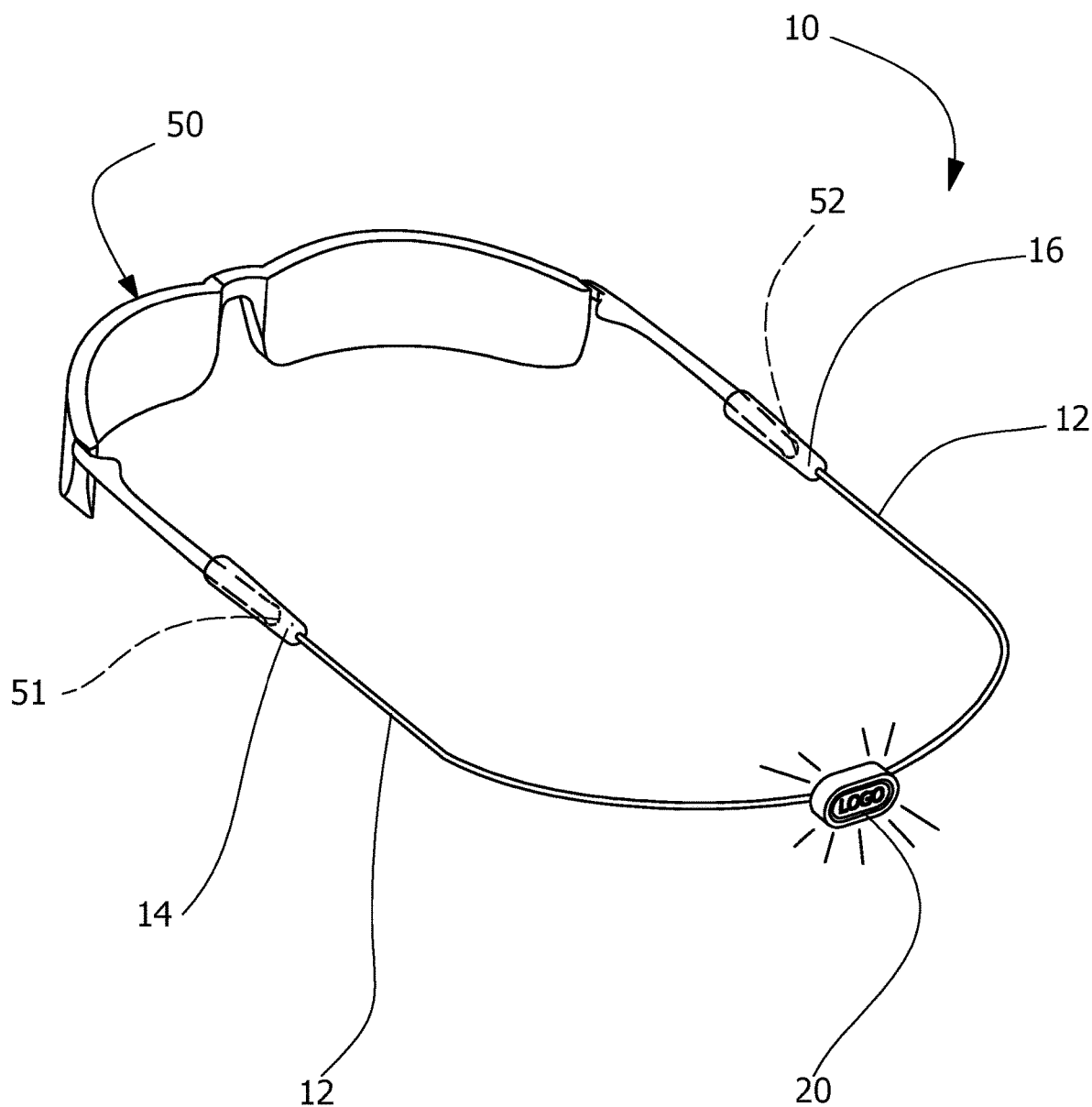
FIG. 1 is a perspective environmental view of an eyewear retainer apparatus according to an embodiment of the invention.

An eyewear retainer device according to a preferred embodiment of the invention is illustrated in FIGS. 1-5, and shown generally at reference numeral 10. The eyewear retainer apparatus 10 comprises an elongate member 12, and a light assembly 20.

The elongate member 12 can comprise a cable made of stainless steel or other suitable material. Alternatively, the elongate member 12 can be a strap made of neoprene or other suitable material, or a cord made of nylon, cotton, leather, or other suitable material. The elongate member 12 can be coated with a photoluminescent material so that the elongate member 12 glows in the dark. In another alternative embodiment, the elongate member 12 can be an illuminated fiber optic wire.

The apparatus 10 includes means for connecting the cable 12 to the temples of a pair of eyeglasses. A pair of attachment members 14, 16 can be positioned at opposed ends of the cable 12. The attachment members 14, 16 are adapted for releasable attachment to the temples 51, 52 of a pair of eye glasses 50, shown in FIG. 1. The attachment members 14, 16, can be tubular members made of rubber or other flexible and resilient material that are sized to fit over the ends of the temples 51, 52 or over earpieces that are positioned over the ends of the temples 51, 52.

The light assembly 20 comprises a housing 21 that contains a light emitting device 25 adapted to emit light. The housing 21 can be made of plastic or other suitable material. Preferably, the light emitting device 25 comprises a plurality of light emitting diodes (LED) 22 operatively connected to a power source 24, shown in FIG. 7. Alternatively, the light emitting device 25 can be an illuminated fiber optic cable, or other suitable light emitting device.

Figure 7:
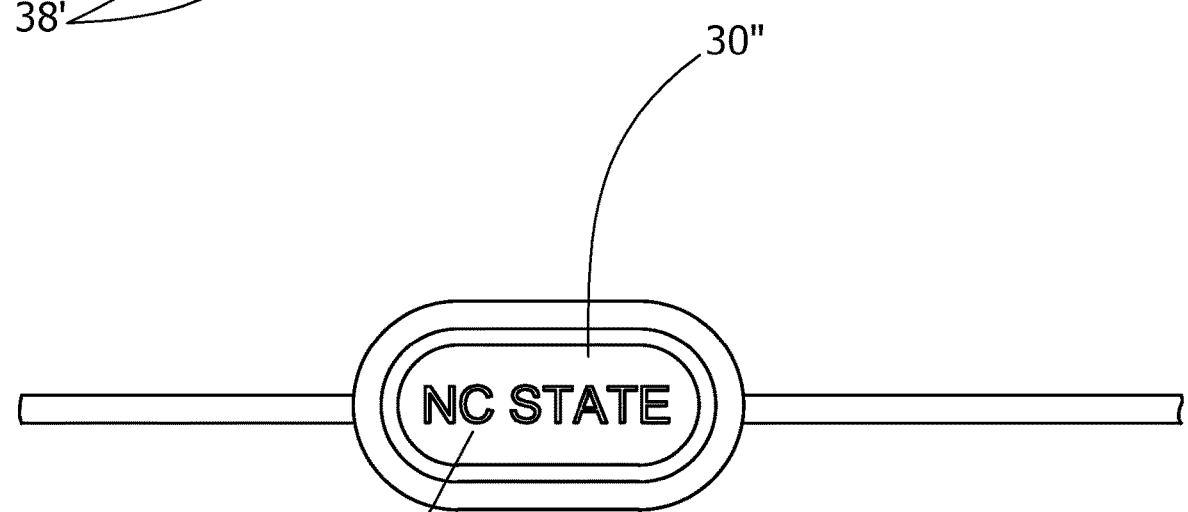
FIG. 7 is another partial perspective view of the apparatus of FIG. 1.

The power source 24 for the light emitting device 25 can comprise a battery 24, shown in FIG. 7. Alternatively, the power source 24 can be a solar cell that powers the light emitting diodes 22. Preferably, the light emitting device 25 comprises a solar cell 28 that recharges the battery 24. As such, the battery 24 can be recharged when the light assembly 20 is exposed to sunlight.

Figure 2:
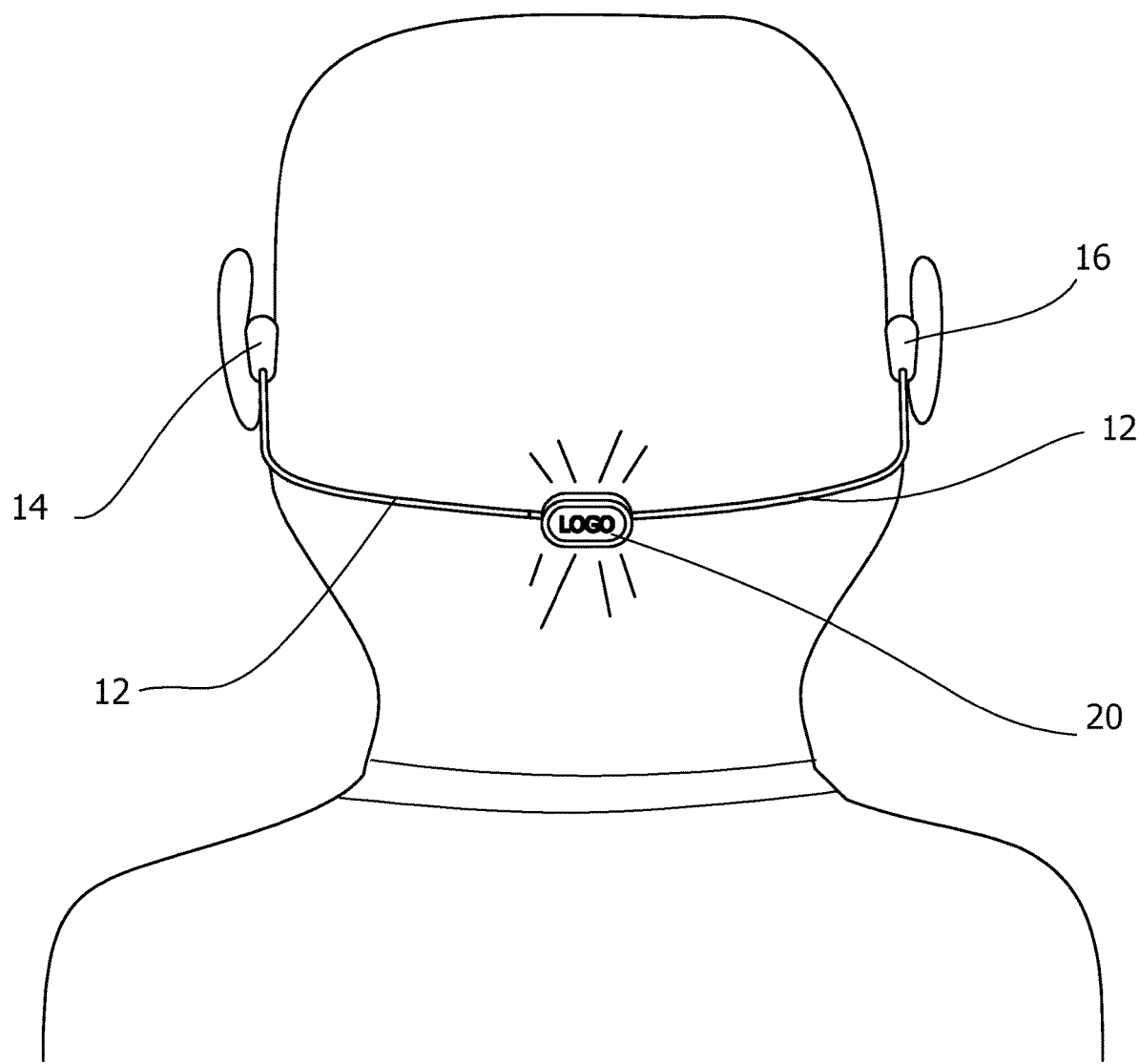
FIG. 2 is another perspective environmental view of eyewear retainer apparatus of FIG. 1.
Figure 11:
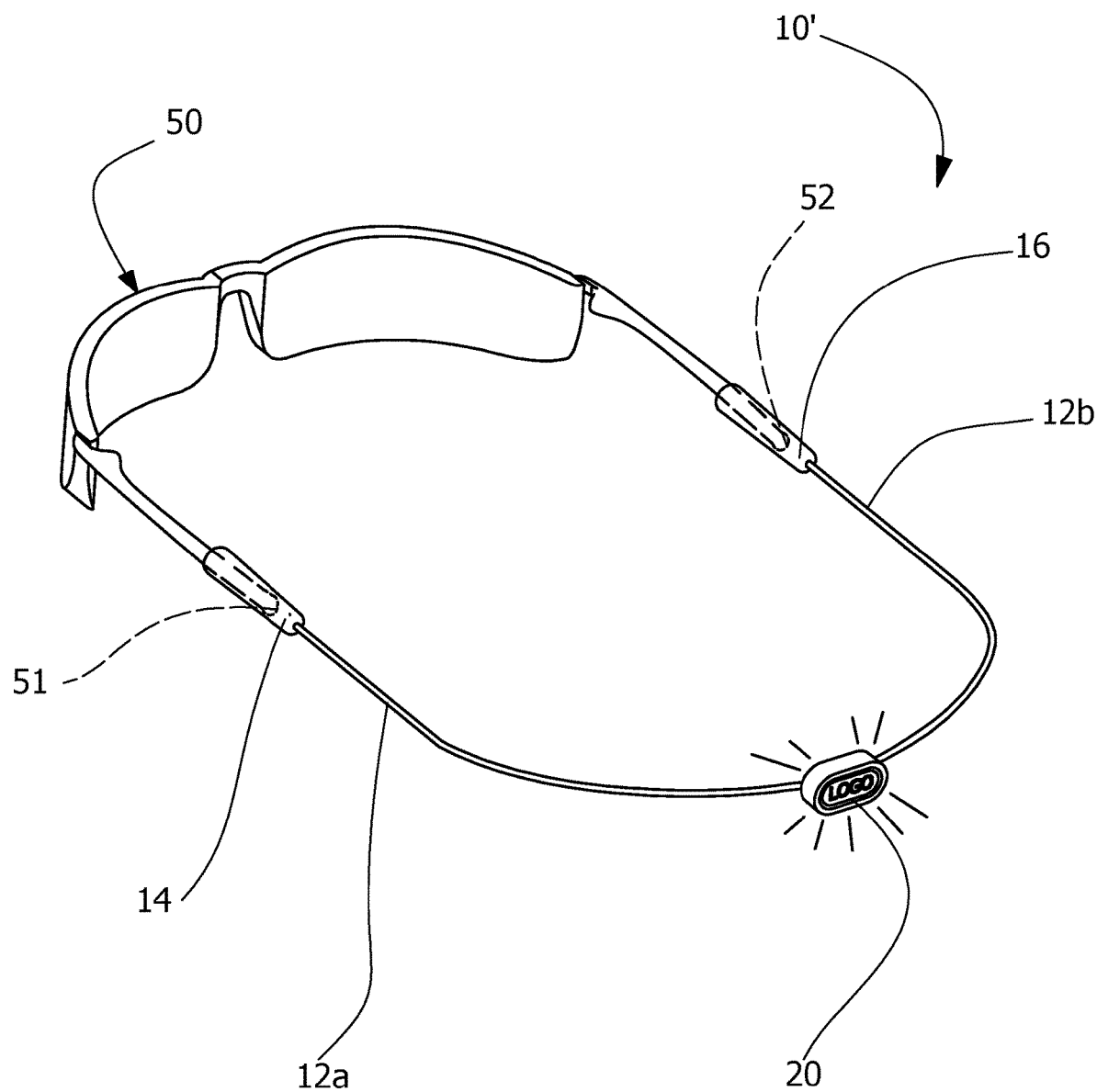
FIG. 11 is an environmental perspective view of an eyewear retainer apparatus, according to another embodiment of the invention.

The light assembly 20 is attached to the single cable 12 proximate the mid-point of the cable 12, as shown in FIGS. 1 and 2. In an alternative embodiment shown at reference numeral 10' in FIG. 11, a pair of separate cables 12a, 12b, can be attached at opposite sides or ends of the housing 21.

The light assembly 20 can be attached to the cable 12 using an adhesive, or other suitable attachment means. In one embodiment, a plurality of eyelets positioned on the outer surface of the light assembly housing 21 receive the cable 12 therethrough. According to another embodiment, the cable 12 can be adhered to The light assembly 20 includes a cover section 30 that is made of transparent or translucent material, such as polycarbonate plastic. The cover section 30 can also comprise a photoluminescent material so that the cover section 30 glows in the dark. The transparent/translucent cover 30 is releasably attached to the housing 21, and allows light generated by the light emitting diodes 22 inside of the housing 21 to pass through.

In a preferred embodiment, the light assembly 20 can include an ambient light sensor 26 that is operatively connected to the light emitting diodes 22, such that the light emitting diodes 22 are activated and emit light when the amount of ambient light detected by the sensor 26 falls below a predetermined minimum. For example, the ambient light sensor 26 can be programmed to activate the light emitting diodes 22 when the light sensor 26 detects an illuminance of less than 100 lux. The light emitting diodes 22 automatically emit light whenever it is dark in the environment in which the apparatus 10 is being used. As such, if the apparatus 10 falls to the ground or otherwise becomes separated from the user at night or other dark environment, the light emanating from the light assembly 20 helps the user easily locate the apparatus 10 and the eyeglasses 50 attached to the apparatus 10.

A logo 38 can be engraved or printed on the top surface of the cover section 30. The term "logo", as used throughout this application, refers generally to any distinctive indicia, markings, alphanumeric characters and/or graphics. The logo 38 can be, but is not limited to, a company name, trademark, sports team name and/or school name or insignia. The light emitted by the light emitting diodes 22 illuminates the logo 38.

Figure 3:
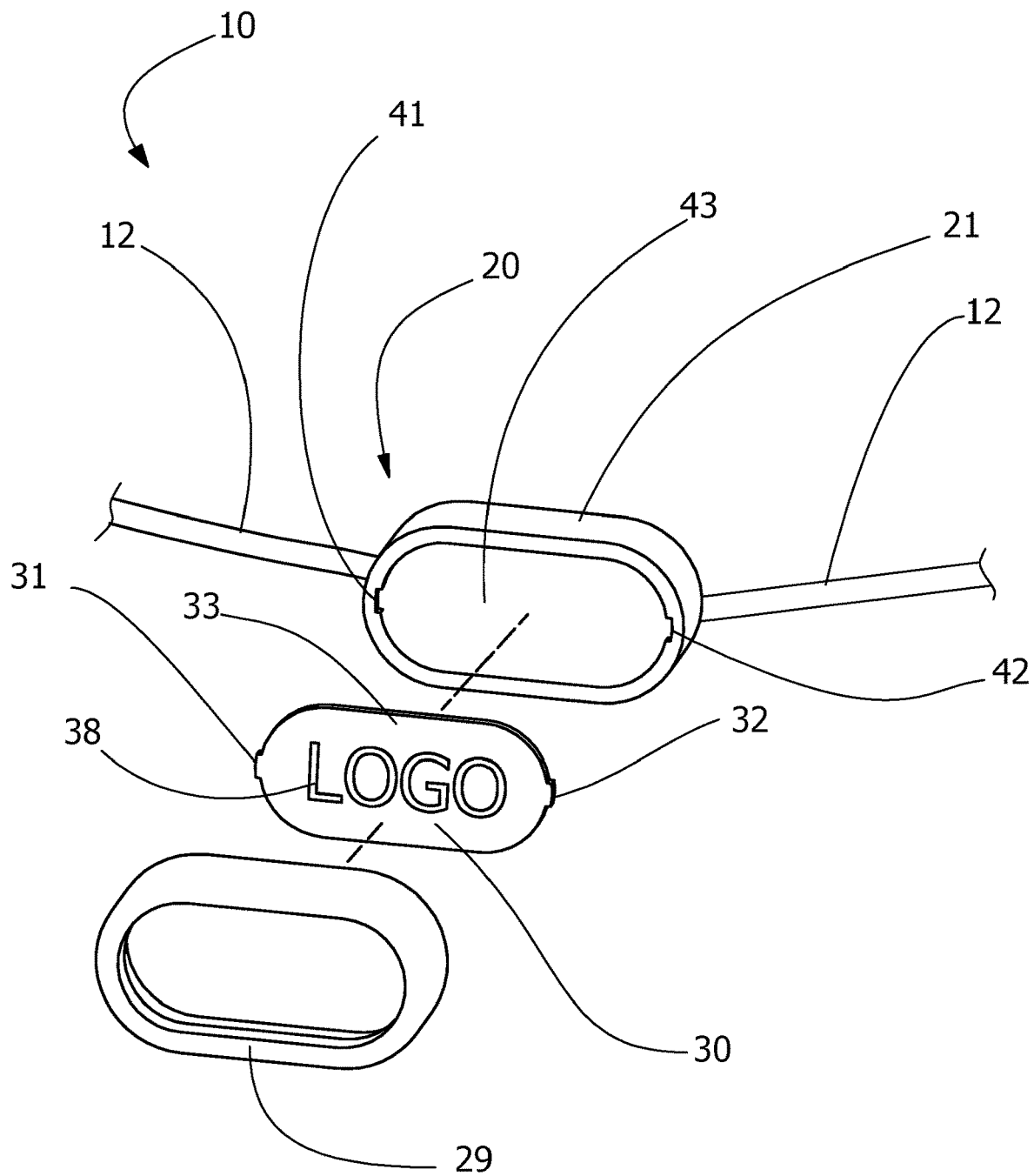
FIG. 3 is a partial schematic view of the apparatus of FIG. 1.
Figure 4:
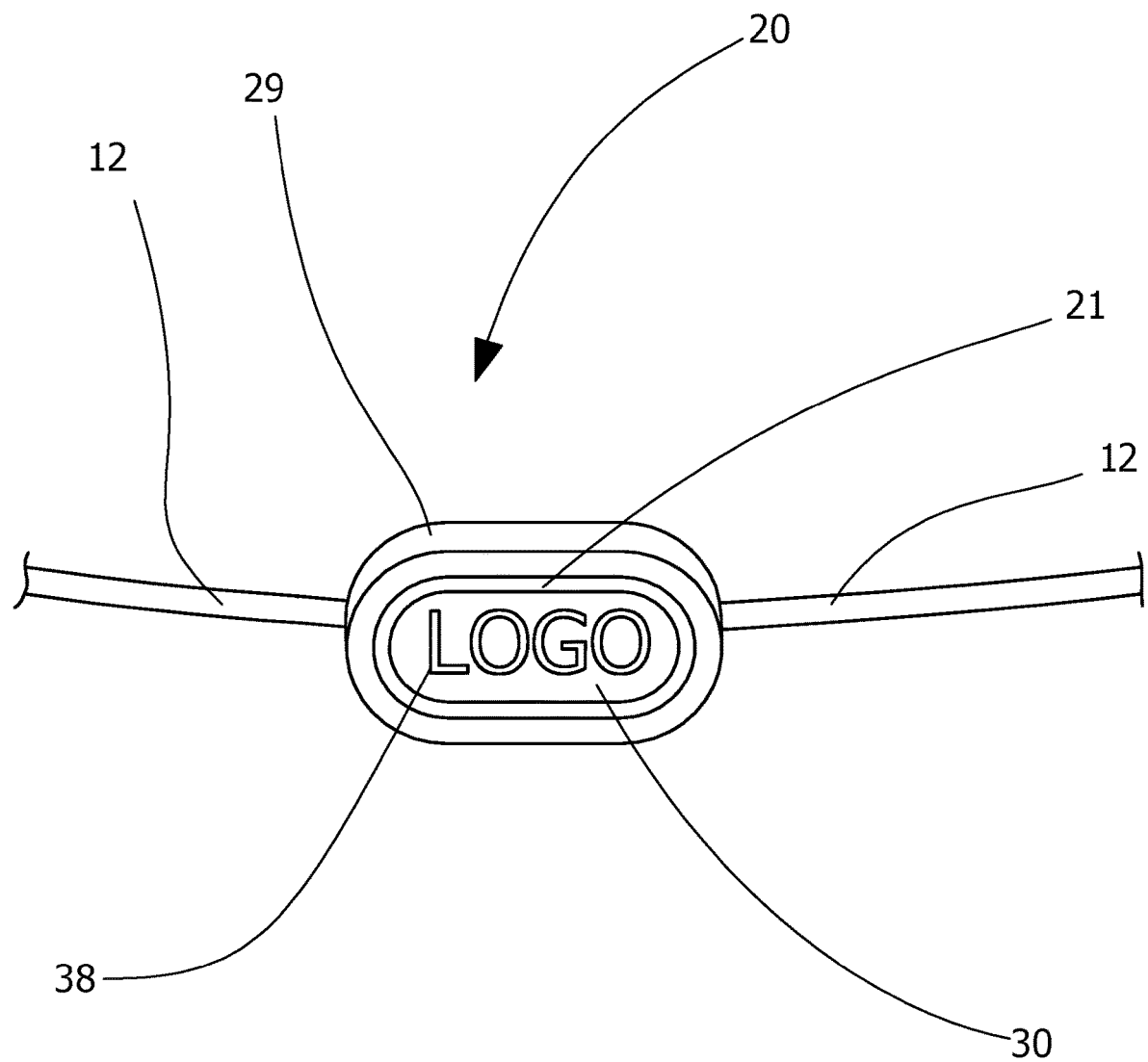
FIG. 4 is a partial perspective view of the apparatus of FIG. 1.
Figure 5:
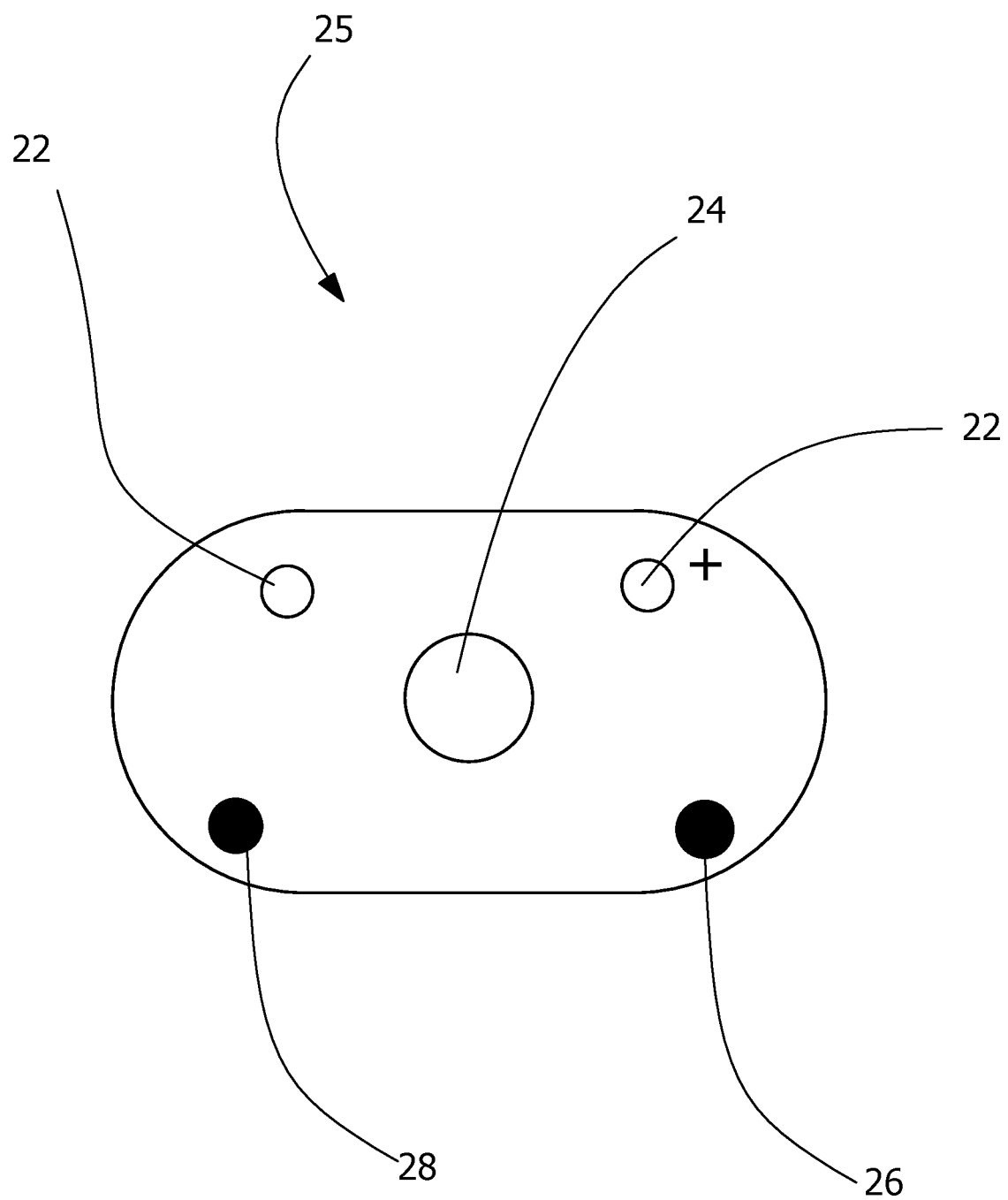
FIG. 5 is a partial schematic view of the apparatus of FIG. 1.

The housing 21 is adapted so that the cover 30 can be releasably attached to the housing 21 and easily removed therefrom. The cover 30 can include a oval section 33 and a pair of flanges 31, 32 extending outwardly from opposite ends of the oval section 33, as shown in FIG. 3. The light assembly housing 21 can include an oval opening 43 having an area approximately equal to the area of oval section 33 of the cover section 30. A pair of complementary recesses 41, 42 can be formed in the housing 21 at opposite ends of the oval opening 43 to receive and engage the flanges 31, 32 of the cover section 30, as shown in FIG. 3. Alternatively, the cover 30 can be releasably attached to the housing 21 by other means, such as a snap-in mechanism. As shown in FIGS. 3 and 4, an outer band section 29, made of an elastic material, can be positioned on the housing 21. The outer band 29 helps keep the cover 30 on the housing 21. When it is desired to remove the cover 30, the band 29 can be removed from the housing 21. The cable 12 can be connected to the light assembly 20 by attaching the cable 12 to the band 29 with an adhesive. Alternatively, the band 29 and the cable 12 can be integrally formed together as a single piece, such as by injection molding or three dimensional printing.

Figure 6:
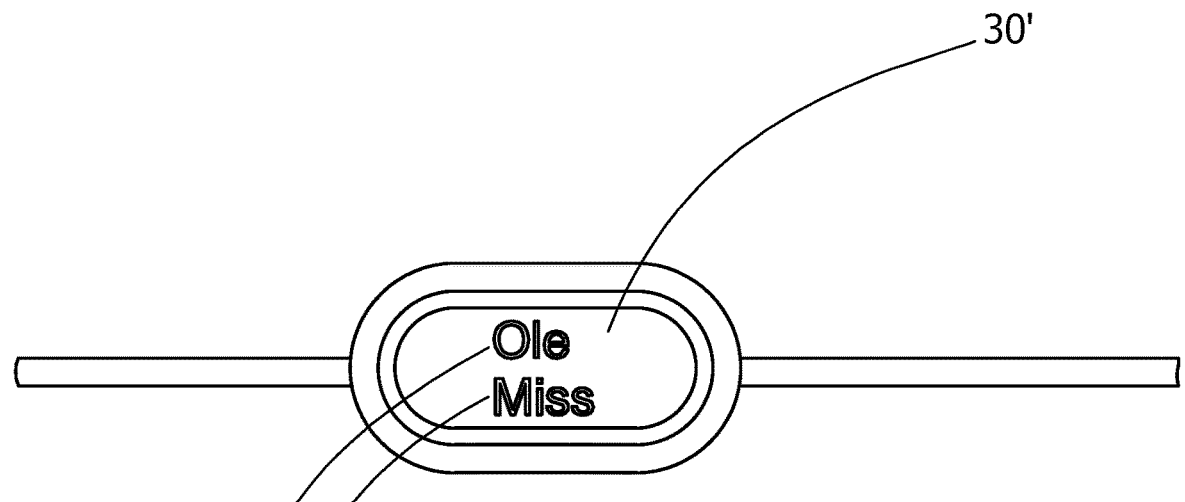
FIG. 6 is a partial perspective view of the apparatus of FIG. 1.

The cover 30 can be removed from the housing 21 when desired, and replaced with another cover 30',30" having a different logo 38',38", as illustrated in FIGS. 6 and 7. As such, a variety of logos can be used with a single apparatus 10. The covers are interchangeable, and a plurality of covers having different logos can be used on a single apparatus 10. As such, the apparatus 10 can be customized to a particular user who desires a particular logo for his particular apparatus 10.

In a preferred embodiment of the invention, the elongate member 12 can be a transparent or translucent fiber optic wire, and the light assembly 20 includes light emitting diodes positioned to illuminate the fiber optic wire. As such, the elongate member 12 lights up when the light assembly 20 is activated.

In an embodiment of the invention, the light assembly housing 21 can be made of a material that floats in water. As such, if the apparatus 10 becomes separated from the wearer while in water, the light assembly housing 21 causes the apparatus 10 and the glasses 50 attached to the apparatus 10 to float on the water.

According to another embodiment of the invention, the cover section 30 can be made of a super absorbent polymer, such as sodium polyacrylate, which floats and significantly expands in volume when in water. As such, if the apparatus 10 is dropped into a body of water, the size of the cover section 30 greatly expands in size making it easier for the user to locate the apparatus 10. In an alternative embodiment, a piece of super absorbent material can be attached to the outer surface of the light assembly housing 21.

Figure 8:
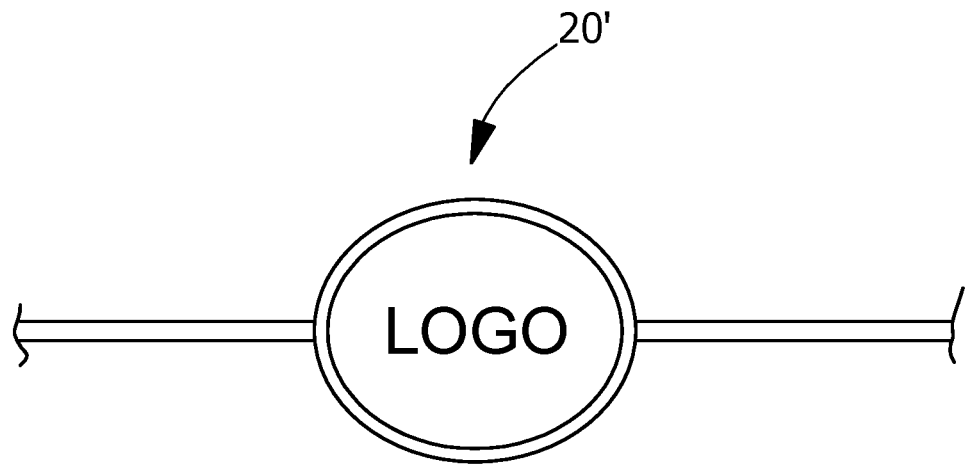
FIG. 8 is a partial perspective view of an eyewear retainer apparatus, according to another embodiment of the invention.
Figure 9:
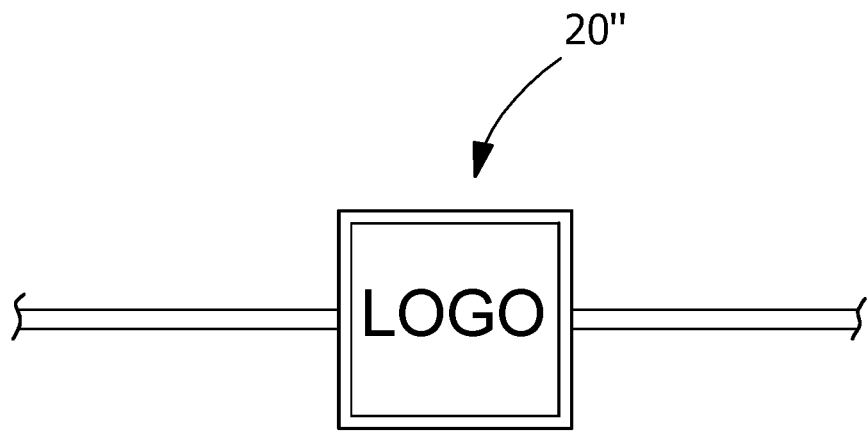
FIG. 9 is a partial perspective view of an eyewear retainer apparatus, according to another embodiment of the invention.
Figure 10:
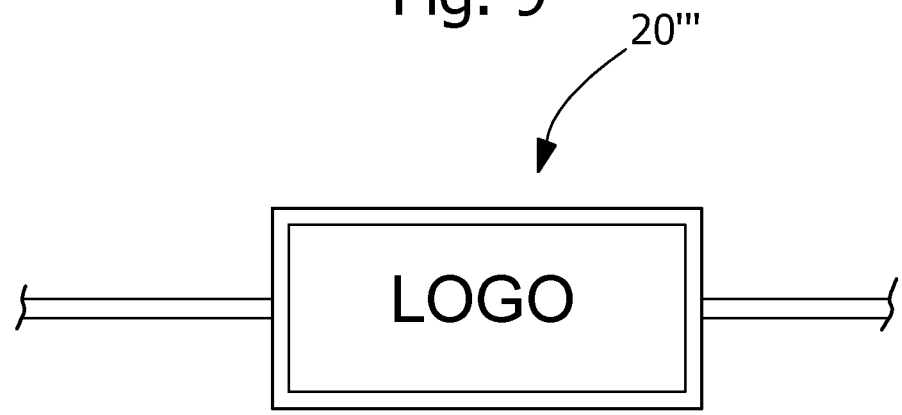
FIG. 10 is a partial perspective view of an eyewear retainer apparatus, according to another embodiment of the invention.

While the light assembly 20 described above is shown as having an oval shape, the invention is not so limited and can include light assemblies of various shapes, including but not limited to, a light assembly 20' having an circular shape as shown in FIG. 8, a light assembly 20" having a square shape as shown in FIG. 9, and/or a rectangular shape 20'" as shown in FIG. 10.

In an alternative embodiment, the light assembly 20 can include wireless technology, such as the wireless communication technology sold under the mark "BLUETOOTH", which is operatively connected to the light emitting diodes 22 and a remote control, such that the remote control can turn the light emitting diodes 22 on and off. The remote control can be a computing device comprising a computer processor, such as a computer or mobile smartphone. The remote control can be operated by a human user that activates the light emitting diodes 22 of the light assembly 20 at times the user deems appropriate. Alternatively, the remote control comprises a computer processor and a non-transitory computer readable storage medium comprising software having programming instructions that, when executed, cause the computer processor to automatically activate the light emitting diodes 22 in response to a particular event. In another embodiment, the software can be integrated into a mobile application that can be downloaded onto mobile smartphones and allows each individual to select the particular events that will automatically activate the individual's particular light assembly 20.

Another embodiment of the invention comprises a lanyard with the light assembly 20 attached thereto.

Figure 12:
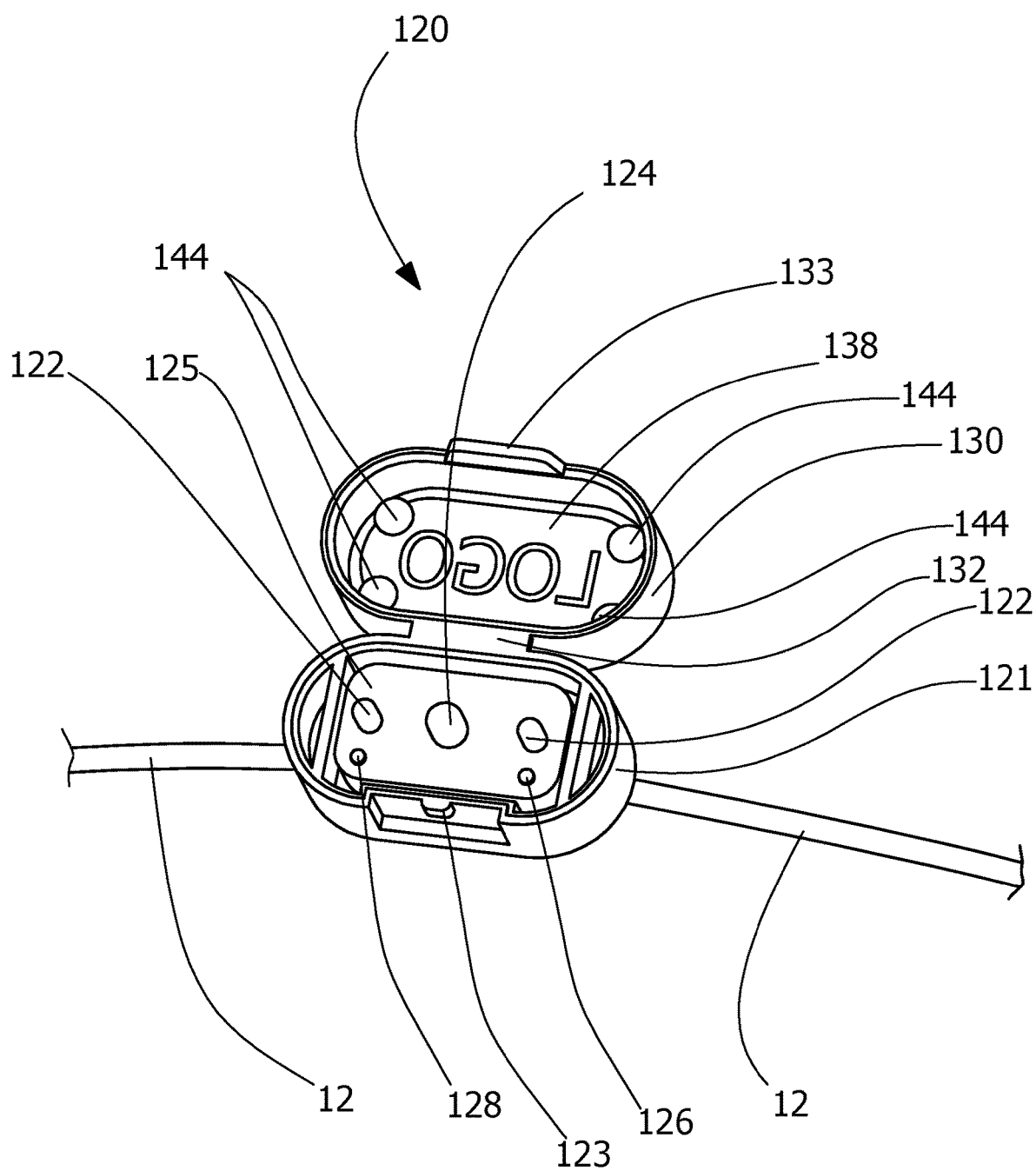
FIG. 12 is a perspective view of an eyewear retainer apparatus, according to another embodiment of the invention.

FIG. 12 illustrates a light assembly according to another embodiment of the invention, shown generally at reference numeral 120. The light assembly 120 comprises a housing 121 having a cover member 130 that is pivotally connected to the housing 121 by a hinge 132. A first locking member 123 is positioned on the housing 121 and a second locking member 133 is positioned on the cover 130. The first and second locking members 123, 133 are adapted for complementary releasable engagement such that the cover member 130 is maintained in a closed position on the housing 121 when the first and second locking members 123, 133 are engaged together. The housing 121 and the cover member 130 are substantially transparent or translucent. The housing 121 and the cover member 130 can be made of plastic or other suitable material. The housing 121 and the cover member 130 can made by injection molding, three dimensional printing, or other suitable process.

A substantially flat logo piece 138 is positioned on the under surface of the cover member 130. The logo piece 138 can be held in place by a plurality of retaining members 144 extending outwardly from the under surface of the cover member 130. The retaining members 144 and the under surface of the cover member 130 define slits that receive the logo piece 138. When desired, the logo piece 138 can be removed and replaced with a different logo piece that is slid in between the retaining members 144 and the cover member 130. Alternatively, the logo piece 138 can be attached to the interior surface of the cover member 130 with a releasable adhesive. The interior of the housing 121 can be accessed by disengaging the first and second locking members 123, 133 and pivoting the cover member 130 to the open position, shown in FIG. 12. The housing 121 contains a lighting device 125 that can be comprised of light emitting diodes 122, a battery 124, an ambient light sensor 126 operatively connected to the light emitting diodes and a solar cell 128.

An eyewear retainer apparatus and method of using same are described above. Various changes can be made to the invention without departing from its scope. The above description of embodiments of the invention are provided for the purpose of illustration only and not limitation—the invention being defined by the claims.

What is claimed is:

1. An eyewear retention apparatus comprising:
   (a) an elongate member having a first end and a second end;
   (b) a first attachment member attached proximate the first end of the elongate member, and a second attachment member attached proximate the second end of the elongate member, the first attachment member and the second attachment member adapted to attach to temples of a pair of eyeglasses; and
   (c) a light assembly adapted to emit light and attached to the elongate member intermediate the first attachment member and the second attachment member, wherein the light assembly comprises a light emitting device and an ambient light sensor operatively connected to the light emitting device, whereby the light emitting device is activated to emit light when the ambient light sensor detects a level of ambient light below a predetermined minimum.

2. The eyewear retention apparatus according to claim 1, wherein the light assembly comprises a housing containing a light emitting device therein, and at least a portion of the housing is transparent or translucent.

3. The eyewear retention apparatus according to claim 2, wherein the light emitting device comprises at least one selected from the group consisting of a flexible printed circuit board and a light emitting diode.

4. The eyewear retention apparatus according to claim 1, wherein the light assembly comprises a housing containing a light emitting device therein, and a transparent or translucent cover member releasably attached to the housing, whereby at least some light emitted by the light emitting device can pass through the cover member.

5. The eyewear retention apparatus according to claim 4, wherein the light emitting device comprises at least one selected from the group consisting of a flexible printed circuit board and a light emitting diode.

6. The eyewear retention apparatus according to claim 4, wherein the cover member includes a logo positioned thereon.

7. The eyewear retention apparatus according to claim 6, wherein the logo is engraved or printed on a surface of the cover member.

8. The eyewear retention apparatus according to claim 6, wherein the logo comprises at least one selected from the group consisting of alphanumeric characters and graphics.

9. The eyewear retention apparatus according to claim 6, wherein the elongate member comprises a cord or strap comprising at least one material selected from the group consisting of neoprene, nylon, cotton and leather.

10. The eyewear retention apparatus according to claim 1, wherein the elongate member comprises a cord or strap comprising at least one material selected from the group consisting of neoprene, nylon, cotton, leather and a photoluminescent material.

11. The eyewear retention apparatus according to claim 1, wherein the elongate member comprises a steel cable.

12. The eyewear retention apparatus according to claim 1, wherein the elongate member comprises an illuminated fiber optic wire.

13. An eyewear retention apparatus comprising:
   (a) a first elongate member having a first end and a second end, and a second elongate member having a first end and a second end;
   (b) a first attachment member attached proximate the first end of the first elongate member, and a second attachment member attached proximate the first end of the second elongate member, the first attachment member and the second attachment member adapted for releasable attachment to temples of a pair of eyeglasses; and
   (c) a light assembly adapted to emit light, the light assembly attached proximate the second end of the first elongate member and proximate the second end of the second elongate member, wherein the light assembly comprises a light emitting device and an ambient light sensor operatively connected to the light emitting device, whereby the light emitting device is activated to emit light when the ambient light sensor detects a level of ambient light below a predetermined minimum.

14. The eyewear retention apparatus according to claim 13, wherein the light assembly comprises a housing containing a light emitting device therein, and a transparent or translucent cover member releasably attached to the housing, whereby at least some light emitted by the light emitting device can pass through the cover member.

15. The eyewear retention apparatus according to claim 14, wherein a logo is engraved or printed on a surface of the cover member.

16. The eyewear retention apparatus according to claim 13, wherein each of the first and second elongate members comprises a cord or strap comprising at least one selected from the group consisting of neoprene, nylon, cotton, leather and a photoluminescent material.

17. The eyewear retention apparatus according to claim 13, wherein each of the first and second elongate members comprises a transparent or translucent fiber optic wire, and the light assembly illuminates the fiber optic wire.

18. An eyewear retention apparatus comprising:
   (a) an elongate member having a first end and a second end;
   (b) a first attachment member attached proximate the first end of the elongate member, and a second attachment member attached proximate the second end of the elongate member, the first attachment member and the second attachment member adapted to attach to temples of a pair of eyeglasses; and
   (c) a light assembly adapted to emit light and attached to the elongate member intermediate the first attachment member and the second attachment member, the light assembly comprising a housing containing a light emitting device therein, an ambient light sensor operatively connected to the light emitting device, whereby the light emitting device is activated to emit light when the ambient light sensor detects a level of ambient light below a predetermined minimum, and a transparent or translucent cover member releasably attached to the housing, whereby at least some light emitted by the light emitting device can pass through the cover member, and wherein a logo is engraved or printed on a surface of the cover member.

19. The eyewear retention apparatus according to claim 18, wherein the logo comprises at least one selected from the group consisting of alphanumeric characters and graphics.

* * * * *